United States Patent [19]

Takaoka et al.

[11] Patent Number: 4,682,321
[45] Date of Patent: Jul. 21, 1987

[54] OPTICAL RECORDING MEDIUM

[75] Inventors: Takashi Takaoka, Yokohama; Satoru Koyahara, Tokyo; Tetsuo Saito, Yokohama, all of Japan

[73] Assignee: Kabushiki Kaisha Toshiba, Kawasaki, Japan

[21] Appl. No.: 694,664

[22] Filed: Jan. 24, 1985

[30] Foreign Application Priority Data

Jan. 28, 1984 [JP] Japan .................. 59-14058

[51] Int. Cl.$^4$ .............. G01D 15/34; G11B 7/24
[52] U.S. Cl. ................... 369/284; 346/762; 346/135.1; 369/275; 369/286
[58] Field of Search ............ 369/284, 275, 286; 346/76 L, 135.1

[56] References Cited

U.S. PATENT DOCUMENTS 3,959,799  5/1976  Gambina et al. ............... 346/76 L
4,477,819 10/1984  Lee et al. ...................... 246/76 L

FOREIGN PATENT DOCUMENTS 2536264  8/1975  European Pat. Off. .
2909877 12/1978  European Pat. Off. .
0017289 10/1980  European Pat. Off. .
0095821 12/1983  European Pat. Off. .
2742976  3/1978  Fed. Rep. of Germany .
2845590  8/1979  Fed. Rep. of Germany .
3142532  9/1982  Fed. Rep. of Germany .
54-20137  7/1979  Japan .
54-20136  7/1979  Japan .

OTHER PUBLICATIONS

Multilayer Memory Elements for Beam Addressable Memories-M. H. Brodsky-Mar. 1971.
K. N. Tu et al., "Silicide Films for Archival Optical Storage", Appl. Lett. 39(11), Dec. 1, 1981; pp. 927–929.

Primary Examiner—Steven L. Stephan
Attorney, Agent, or Firm—Cushman, Darby & Cushman

[57] ABSTRACT

An optical disk for recording information, comprising a substrate and a plurality of thin film layers disposed on said substrate, each film having different optical extinction coefficient from that is the others. The thin film layers can be converted into a single layer when irradiated with a recording beam.

9 Claims, 10 Drawing Figures

OPTICAL RECORDING MEDIUM

BACKGROUND OF THE INVENTION

The present invention relates to an optical recording medium, and more specifically to an optical disk which can record data in heat mode when irradiated with a laser beam.

The recording mechanism of conventional memory optical disks is classified into the three categories shown in FIGS. 1 to 3.

In the first recording mechanism, various types of information are recorded in the following manner. A thin film 2 of a low-melting point material, such as Te or a Te alloy, and having a thickness of 20 to 80 nm is formed on a transparent substrate 1 of glass, polyacrylic resin, polycarbonate resin or the like. This film is irradiated with a laser beam, and its irradiated portion melts or evaporates, thereby forming a small pit 3. Thus, information is recorded.

In the second recording mechanism shown in FIG. 2, a gas-releasing film 5 and a metal film 6 are formed on a substrate 4. When the film 6 is irradiated with a laser beam, a gas is released in the irradiated portion of gas releasing film 5 by heat generated upon laser beam irradiation. The gas forms voids which result in raised blisters or bubbles 7 in the metal film 6, thereby recording information.

In the third recording mechanism shown in FIG. 3, a thin film 9, which changes its structure upon temperature change, is formed on a substrate 8. The film 9 is irradiated with a laser beam. The irradiated portion has its structure changed. For example, this portion changes from a crystalline structure to an amorphous structure, thereby changing reflectance and recording information.

Another recording mechanism is known. As disclosed in Japanese Patent Publication No. 54-20137 and Appl. Phys. Lett. vol. 39, 927 (1981), a disk with recording and non-recording parts have different transmission/reflection characteristics is used. When any part is irradiated with a laser beam, its transmission/reflection characteristics is detected to determine whether information is recorded or not.

In the recording mechanisms shown in FIGS. 1 and 2, upon recording information, the recording film evaporates or changes its shape. Therefore, when a protective film is directly formed on the recording film, the recording sensitivity is degraded significantly. Therefore, to make practical use of these mechanisms, an air-sandwich structure must be adopted wherein the protective plate is arranged at a distance from the recording film. A disk of this complex structure is difficult to manufacture. In the recording mechanism shown in FIG. 3, even if the protective film is formed directly on the recording film, the recording sensitivity will not be significantly decreased. However, since this mechanism utilizes the structural change of the recording film, the boundary between recording and non-recording parts is unstable. Hence, the lifetime of the recorded data is short.

SUMMARY OF THE INVENTION

It is an object of the present invention to provide an inexpensive optical disk which is easy to manufacture and can record information without changing the shape of a recording part, so that its recording sensitivity and recorded state are very stable.

The optical disk according to the present invention consists of a substrate and a recording layer formed on the substrate and consisting of a plurality of thin films of different materials. The thin films can be converted into a single film upon irradiation with a recording beam, thereby recording information. A laser beam can be used as the recording beam.

The substrate of the optical disk according to the present invention must be transparent in order to allow a laser beam to pass through it. Hence, the substrate may be made of glass, polyacrylic resin, polycarbonate resin or the like.

The materials of the thin films which can be converted into a single film upon irradiation with a laser beam must be materials having different optical extinction coefficients. As the recording layer comprises a multilayered body of a plurality of thin films having different optical extinction coefficients, irradiated portions of the thin films are converted into a single film by mutual diffusion. The reflectivity at this portion is then changed from the rest of the film, thus recording information. The information recorded in this manner is read out by irradiating the film with a laser beam having an intensity below a recording threshold intensity and by reading a difference in reflectivity.

When the recording layer is a bilayered one, the ratio of the optical extinction coefficients is preferably set to be 1.5 or more. When this ratio is large, i.e., 1.5 or more, a change in reflectivity of the films upon conversion into a single film is large and an optical disk having a large reading signals can then be obtained.

The thin films can be arranged in various ways. That is, a thin film having a larger or smaller optical extinction coefficient can be arranged at the incident side of a laser beam. In the former case, when the thin films are converted into a single film by irradiation with a laser beam, the reflectivity is reduced. However, in the latter case, the reflectivity is increased. That is, in the latter case, if the initial reflectivity of the recording layer is low, the utilization effect of a laser beam is high. Furthermore, since information is recorded in bright spots, pulse noise occurring due to dark portions such as pinholes in the recording layer or scratches in the substrate can be easily separated from signals of recorded spots. Thus, a high S/N ratio can be obtained, and the latter arrangement is therefore preferable.

In the optical disk of the present invention, examples of materials constituting thin films of a recording layer and having smaller optical extinction coefficients are Ge, Te, Bi, Tl, and alloys containing these elements as major constituents, and examples of those having larger extinction coefficients are Te, Bi, Sb, Ag, In and alloys containing these elements as major constituents. At least two thin films of these materials can be combined to form a multilayer body. When such a recording layer is locally irradiated with a laser beam, the thin films are heated and thereby undergo mutual diffusion, thus forming a one film of an alloy of these metals.

When the recording layer consists of two thin films, the thin films preferably comprise Se-Bi, Te-Bi, Te-Ge and Ge-Bi.

Furthermore, when the recording layer consists of two thin films, the thin film at the incident side preferably has a thickness of 50 nm or less and the other thin film preferably has a thickness of 100 nm or less so as to provide excellent recording sensitivity.

According to the optical disk of the present invention, optical characteristics of a recording film can be significantly changed without changing the shape of an irradiated portion with a laser beam, and information can be recorded thereby.

DETAILED DESCRIPTION OF THE PREFERRED EMBODIMENTS

The preferred embodiments of the present invention will now be described with reference to the accompanying drawings.

Figure 1:
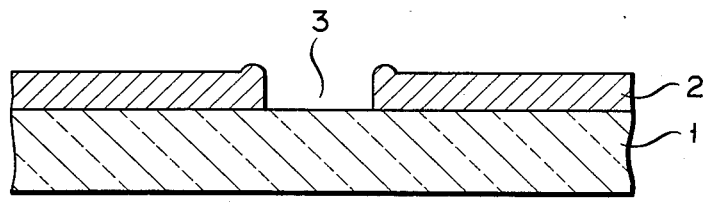
FIGS. 1 to 3 are sectional views showing conventional optical disks.
Figure 2:
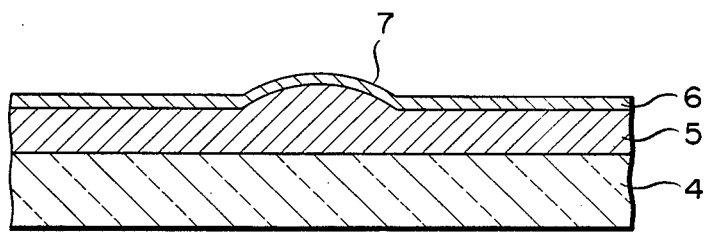
Figure 3:
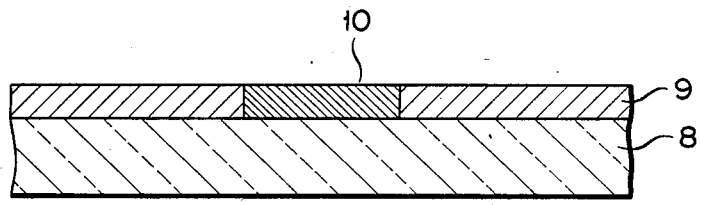
Figure 4:
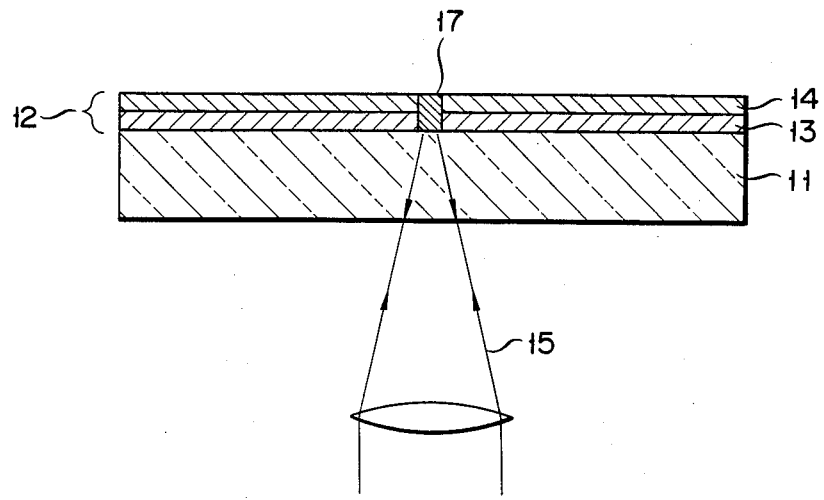
FIG. 4 is a sectional view showing an optical disk according to an embodiment of the present invention.
Figure 5:
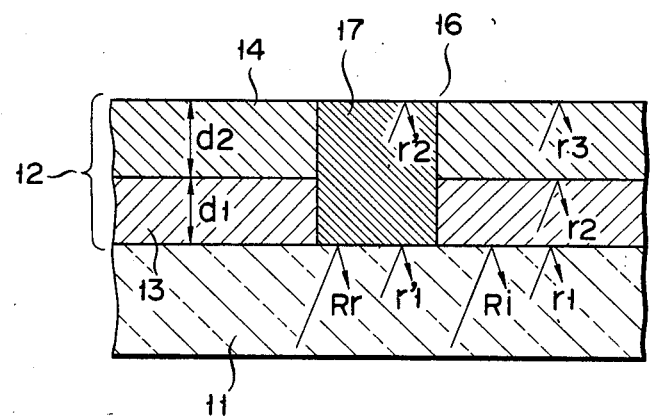
FIG. 5 is a sectional view showing the main part of the section in FIG. 4.

Referring to FIG. 4, a recording layer 12 consists of first and second thin films 13 and 14 of different optical extinction coefficients and is formed on a transparent substrate 11. In this case, a complex index of refraction $\tilde{n}_1$ of the first thin film 13 is given by $n_1 - ik_1$ ($n_1$: refractive index, $k_1$: optical extinction coefficient). A complex index of refraction $\tilde{n}_2$ of the second thin film 14 is given by $n_2 - ik_2$ ($n_2$: refractive index, $k_2$: optical extinction coefficient). The initial reflectivity Ri of this recording layer 12, i.e., the reflectivity before irradiation with a laser beam 15 having an intensity exceeding the threshold value for recording, is determined by the vector sum of the Fresnel's reflection coefficients $r_1$, $r_2$ and $r_3$ at the boundaries between the substrate 11 and the first thin film 13, the first thin film 13 and the second thin film 14, and the second thin film 14 and an outside region 16. In this case, the vector length of each Fresnel's reflection coefficient is mainly determined by the complex indices of refraction $\tilde{n}_1$ and $\tilde{n}_2$ of the first and second thin films 13 and 14. The vector phase difference of the Fresnel's reflection coefficient is mainly determined by thicknesses $d_1$ and $d_2$ of the first and second thin films 13 and 14, respectively. Therefore, the initial reflectivity Ri can be freely set by properly selecting the materials of the first and second thin films 13 and 14 and the thicknesses $d_1$ and $d_2$.

When the recording layer 12 having the proper initial reflectivity Ri is irradiated with an information-modulated laser beam having an intensity exceeding the recording threshold intensity, the irradiated portion is raised in temperature. The first and second thin films 13 and 14 of the irradiated portion are rapidly mutual-diffused and the boundary therebetween is extinguished. The first and second thin films 13 and 14 are thus converted into a single film 17. The recording threshold intensity is determined by the mutual diffusion coefficient of the materials of the first and second thin films 13 and 14. When the first and second thin films 13 and 14 are converted into the single film 17 in this manner, the Fresnel's reflection coefficient $r_2$ at the boundary between the first and second thin films 13 and 14 is extinguished, and the reflectivity Rr at the recording portion becomes a vector sum of the Fresnel's reflective coefficient $r'_1$, at the boundary between the substrate 11 and the single film 17 and the Fresnel's reflective coefficient $r'_2$ at the boundary between the single film 17 and the outside region 16. The vector sum is determined by the complex index of refraction and thickness of the converted single film 17. Thus, an irreversible change from the initial reflectivity Ri to Rr occurs. In this manner, in the optical disk according to the present invention, recording of information is performed by local conversion of the reflectivity of the recording layer 12 from Ri to Rr by the above-mentioned mechanism. The information recorded in this manner is read out by detecting a change in reflectivity upon irradiating the layer with a laser beam spot of an intensity lower than the recording threshold intensity.

The recording layer 12 to be used in the optical disk of the present invention must satisfy the following conditions: the recording threshold intensity of the laser beam is low, the ratio of the reflectivity Ri to Rr is large, and the first and second films 13 and 14 do not mutually diffuse at room temperature. These conditions are equivalent to conditions of high sensitivity, a high magnitude of the read out signal, and stability over a long period of time. A description will be made with reference to a typical example of a recording layer, i.e., a recording layer consisting of a Te film and an Bi film, which satisfies these conditions.

Figure 6:
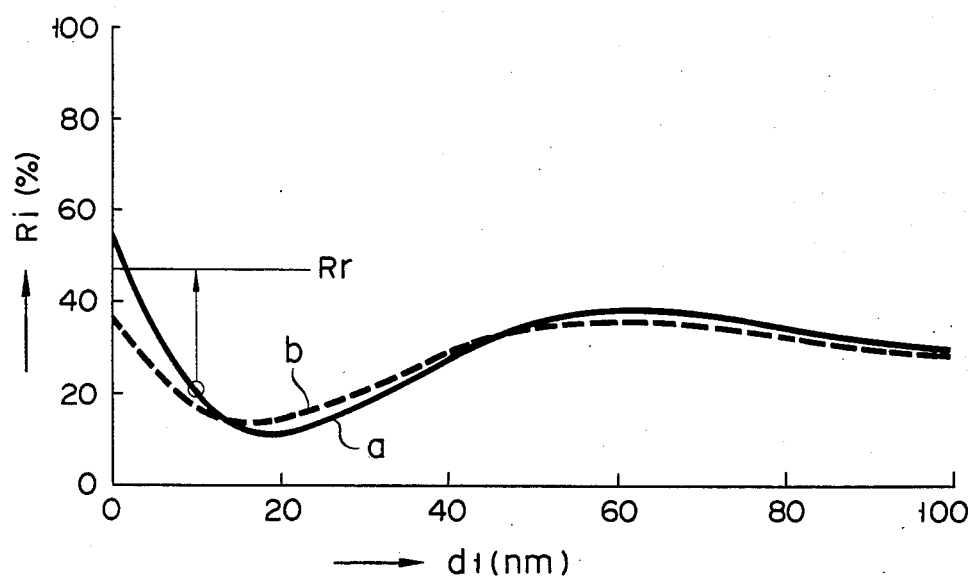
FIGS. 6 and 7 are graphs showing the relationship between the thickness of a first thin film and the reflectivity of a recording layer.
Figure 7:
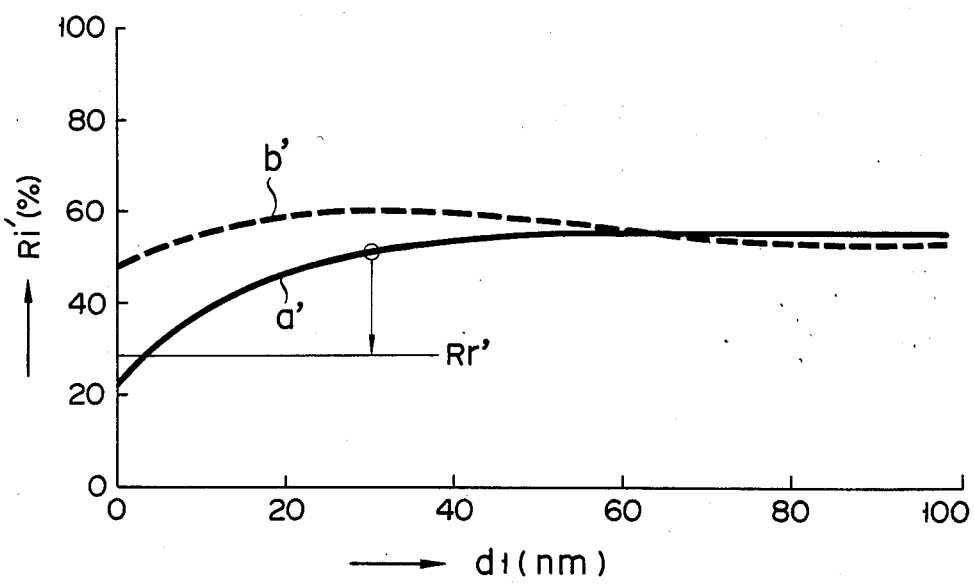

FIGS. 6 and 7 are graphs showing the relationship between the thickness $d_1$ of the first thin film 13 and the reflectivity Ri in the recording layer consisting of the Te and Bi films. Note that Te has a complex index of refraction of $4.7 - 1.5i$, and Bi has that of $1.7 - 3.3i$. FIG. 6 shows the relationship between the thickness $d_1$ of the Te film and the reflectivity Ri when the inequality $k_1 < k_2$ is satisfied (where $k_1$ is the optical extinction coefficient of the first thin film 13 and $k_2$ is that of the second thin film 14) in order to satisfy Ri<Rr. In FIG. 6, solid line a and dotted line b respectively represent the cases wherein the thickness $d_2$ of the Bi film is 80 and 40 nm. A circle on the solid line a represents the value of Ri when the thickness of the Te film is 10 nm, and the arrow represents the change from Ri to Rr.

FIG. 7 shows the relationship between the thickness $d_1$ and the reflectivity Ri' when the inequality $k_1 > k_2$ is satisfied in order to satisfy Ri'>Rr' and the first and second thin films respectively comprise Bi and Te films. In FIG. 7, solid line a' and dotted line b' respectively represent the cases wherein the thickness $d_2$ of the Te film is 80 and 40 nm. A circle on the solid line a' represents Ri' when the thickness of the Bi film is 30 nm, and the arrow shows change from Ri' to Rr'.

The present invention is not limited to the above embodiment shown in FIG. 4, and various changes can be made. Other embodiments will be described below with reference to FIGS. 8 to 10.

Figure 8:
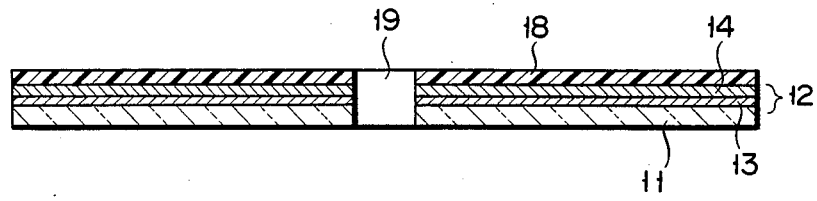
FIGS. 8 to 10 are sectional views showing other embodiments, respectively.

In the embodiment shown in FIG. 8, a substrate 11 is a disk with a central hole 19. A protective layer 18 is formed on the surface of a recording layer 12. A lacquer film, an ultraviolet curing resin film or the like can be used as a protective film.

Figure 9:
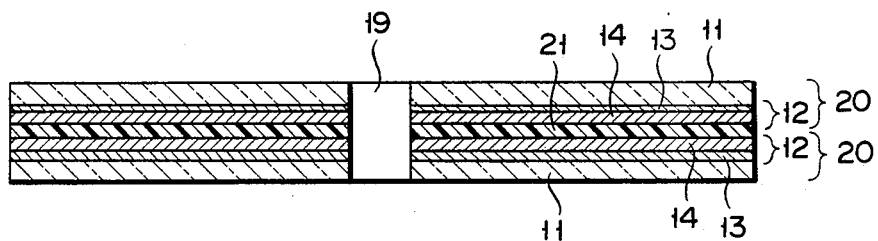

In the embodiment shown in FIG. 9, two single-sided memory optical disks 20 each comprising a substrate 11 and a recording layer 12 consisting of thin films 13 and 14 are adhered through a bonding agent 21 to provide a double-sided memory optical disk. The bonding agent 21 can be a hot-melt type resin.

Figure 10:
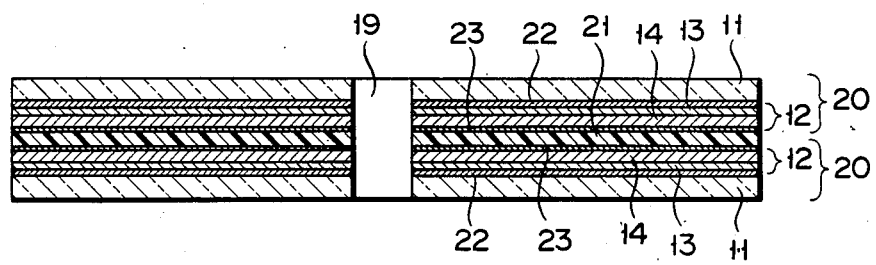

The embodiment shown in FIG. 10 is a double-sided memory optical disk which is an improvement over that shown in FIG. 9. An undercoat 22 for modifying a surface defect is formed on each substrate 11. A protective layer 23 is formed on the surface of each recording layer 12 so as to prevent damage to the layer 12 during the bonding process of the two optical disks 20. The undercoat 22 can consist of a plasma-polymerized coating obtained by using ethylene or freon as a raw gas, and the protective layer 23 can consist of the same material as that of the protective layer 18 in the embodiment shown in FIG. 8.

According to the present invention, the recording layer 12 consists of two thin films 13 and 14. When the recording layer 12 is irradiated with a spot of a laser beam 15, mutual diffusion of the films is locally caused and the films are converted into a single film. The recording layer is not changed in shape, that is, no hole or expansion of the layer is caused for information recording. Therefore, even when the protective layers 18 or 23 are formed on the recording layer 12, or the disks 20 are adhered through the bonding agent 21, the recording sensitivity is not degraded and an inexpensive memory optical disk which is easy to handle can be provided. Since recording of information is performed by converting two films into a single film, the recorded information is stable and can be stored over a long period of time.

What is claimed is:

1. An optical recording medium for recording information, comprising a substrate and a recording layer comprising two thin semiconductor films disposed on said substrate, said two thin semiconductor films consisting of a combination of thin films made of two materials selected from the group consisting of germanium, tellurium, bismuth, antimony and alloys thereof, wherein said thin semiconductor films can be at least partially converted into a single layer when irradiated with a laser beam and information can be recorded by said partial conversion.

2. An optical disk according to claim 1, wherein the thin film layer the laser beam is incident has a small extinction coefficient, and a portion of said converted single layer irradiated with the laser beam has an increased reflectivity.

3. An optical disk according to claim 1, wherein an undercoat is formed between said substrate and said thin film layers.

4. An optical disk according to claim 1, wherein a protective layer is formed on a surface of said thin film layers opposite to a surface thereof which faces said substrate.

5. An optical disk according to claim 1, wherein two of said optical disks are adhered to each other with a pair of said plural thin film layers facing each other to provide a double-sided type optical disk.

6. An optical disk according to claim 1, wherein one thin film on the substrate side has a thickness of not more than 50 nm, and the other thin film has a thickness of not more than 100 nm.

7. An optical disk according to claim 1, wherein said two thin semiconductor films are formed of a combination selected from the group of combinations consisting of tellurium-bismuth, tellurium-germanium, and germanium-bismuth.

8. A disk as in claim 1 wherein the ratio of optical extinction coefficients of said semiconductor layers is at least 1.5.

9. An optical recording medium for recording information, comprising a substrate and a recording layer formed of two thin semiconductor films disposed on said substrate, said two thin semiconductors films consisting of a combination of thin films selected from the group of combinations consisting of tellurium-bismuth, tellurium-germanium, and germanium-bismuth, wherein said thin semiconductor films can be at least partially converted into a single layer by irradiation with a laser beam, so that information can be recorded by said partial conversion.

* * * * *